United States Patent [19]

Tsutsumi et al.

[11] Patent Number: 5,737,867
[45] Date of Patent: Apr. 14, 1998

[54] FISH-LIKE ARTIFICIAL BAIT

[75] Inventors: Teruhiro Tsutsumi; Tomoyuki Moriya, both of Hamamatsu, Japan

[73] Assignee: Shintowa Co., Ltd., Shizuoka-ken, Japan

[21] Appl. No.: 713,728

[22] Filed: Sep. 13, 1996

[30] Foreign Application Priority Data

Feb. 26, 1996 [JP] Japan ................................. 8-037743

[51] Int. Cl.⁶ ................................................. A01K 75/02
[52] U.S. Cl. ........................ 43/17.6; 43/42.33; 43/42.34
[58] Field of Search ............................... 43/17.6, 42.32, 43/42.33, 42.34

[56] References Cited

U.S. PATENT DOCUMENTS 2,117,206  5/1938  Neff .......................................... 43/17.6
4,700,504 10/1987  Mattison ................................... 43/17.6
4,741,120  5/1988  Cota et al. ................................ 43/17.6
4,800,670  1/1989  Mattison ................................... 43/17.6

*Primary Examiner*—J. Woodrow Eldred
*Attorney, Agent, or Firm*—Darby & Darby

[57] ABSTRACT

A fish-like artificial bait comprising a hollow fish-like main body made of a transparent resin material, a concave groove formed in a surface of the main body and served as a scale indicating portion, a heat pressure welded layer using a light non-transmitting transfer foil such as a metallic foil as its material and formed on the surface of the scale indicating portion excepting the concave groove, a light non-transmitting color painted layer formed on the surface of the fish-like main body excepting the scale indicating portion, a light non-transmitting color painted layer formed on the surface of the fish-like main body excepting the scale indicating portion, and a luminous material disposed on an inner side of the fish-like main body and served as a light source for light transmitting through the concave groove.

5 Claims, 2 Drawing Sheets 5,737,867

FISH-LIKE ARTIFICIAL BAIT

BACKGROUND OF THE INVENTION

1. Field of the Invention

This invention relates to a fish-like artificial bait used for fishing.

2. Brief Description of the Prior Art

Fishing using a fish-like artificial bait was recently rapidly spread, in which an artificial bait is bathed in water and the fish attempting to eat this artificial bait is caught by a fish-hook. Various types of fish-like artificial baits are commercially available. It is important for such an artificial bait to look like the living fish and careful attention was paid to the shape of the bait and the brightness of the scale portion for this purpose. For providing brightness to the artificial bait, many proposals was made; a fish-like main body made of resin is plated by vacuum evaporation or applied with a fluorescent painting material so that the artificial bait really looks like the living fish.

However, all of the conventional techniques have the shortcomings in which the fish-like artificial bait is bright and beautiful and really looks like the living fish but only in the day time because the artificial bait can reflect the day light. However, the story is different in the night time because the fishing is obliged to be made in the dark and some luminous light is indispensable. Conventionally, the artificial bait was illuminated by light of a candle or the like, or illumination light of the harbor or the like was utilized for the same purpose.

The present invention has been accomplished in view of the above situation.

SUMMARY OF THE INVENTION

It is, therefore, an object of the present invention to provide a fish-like artificial bait which is particularly suited to be used for night-time fishing because the existence of the bait is made clear without a need of a provision of a special illuminating equipment.

In order to achieve the above object, there is essentially provided a fish-like artificial bait comprising a hollow fish-like main body made of a transparent resin material, a concave groove formed in a surface of the main body and served as a scale indicating portion, a heat pressure welded layer using a light non-transmitting transfer foil such as a metallic foil as its material and formed on the surface of the scale indicating portion excepting the concave groove, a light non-transmitting color painted layer formed on the surface of the fish-like main body excepting the scale indicating portion, a light non-transmitting color painted layer formed on the surface of the fish-like main body excepting the scale indicating portion, and a luminous material disposed on an inner side of the fish-like main body and served as a light source for light transmitting through the concave groove.

It is preferred that a heat pressure welded layer using a water non-permeable transfer foil as its material is formed over an entire area of the surface of the scale indicating portion excepting a surface of a bottom portion of the concave groove.

The material of the heat pressure welded layer may be a metallic foil.

It is preferred that a water-resisting surface layer made of a transparent resin is formed on an entire area of the surface of the fish-like main body.

The luminous material is preferably formed as a layer on an inner side of the fish-like main body.

The above and other objects, characteristic features and advantages of the present invention will become more apparent to those skilled in the art by the following description of the preferred embodiment of the invention, as illustrated in the accompanying drawings.

DETAILED DESCRIPTION OF THE EMBODIMENT

Figure 1:
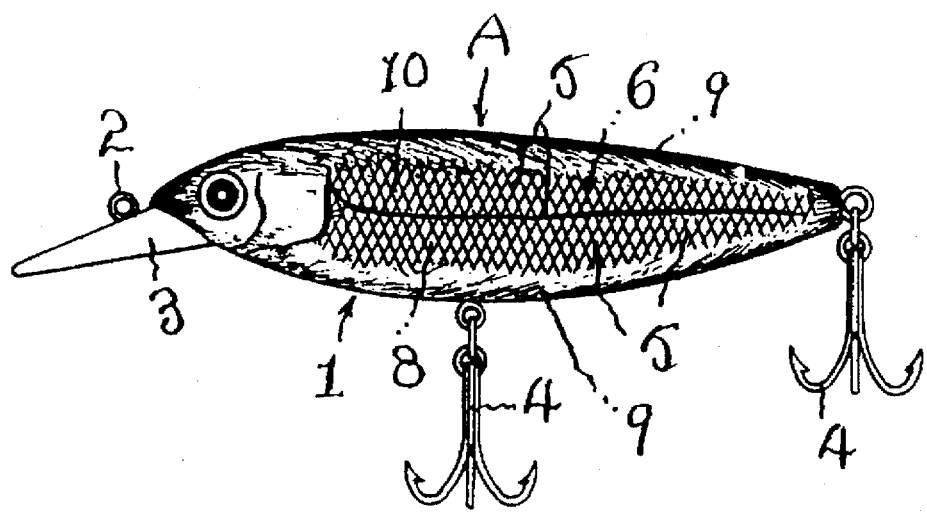
FIG. 1 is a front view of a fish-like artificial bait according to one embodiment of the present invention.
Figure 2:
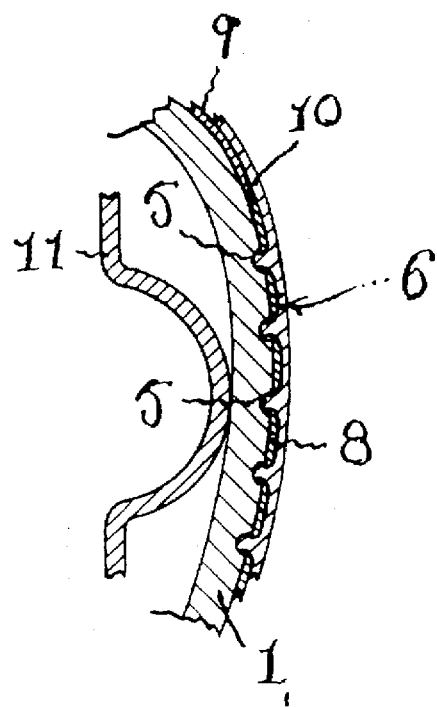
FIG. 2 is an enlarged sectional view of a part of the fish-like artificial bait of FIG. 1.
Figure 3:
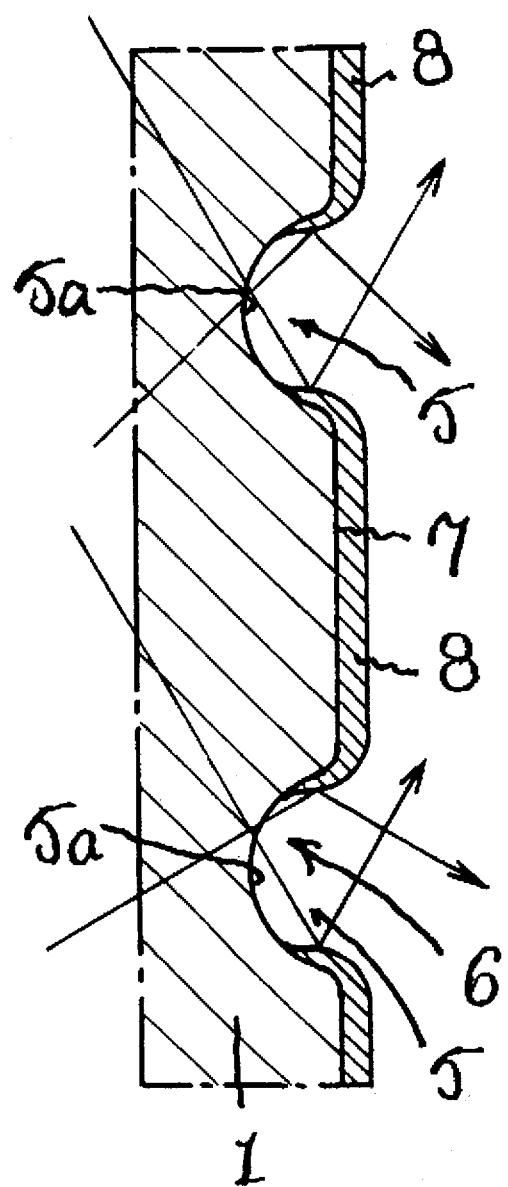
FIG. 3 is an enlarged sectional view showing a relation between concave grooves and a heat pressure welded layer.

The accompanying drawing shows a fish-like artificial bait according to one embodiment of the present invention, FIG. 1 is a front view, FIG. 2 is an enlarged sectional view of a part of FIG. 1, and FIG. 3 is an enlarged sectional view showing a relation between concave grooves and a heat pressure welded layer.

A fish-like artificial bait A of this embodiment comprises a fish-like main body 1, a lip 3 having a ring 2 for connecting a fish-line, and a fish-hook 4. The fish-like main body 1 is formed of a hollow member made of a transparent ABC resin.

The term "transparent" used herein refers to "light transmitting". The ABS resin is employed because it has weathering resistance, water-resisting properties or high-impact properties. Other resin having such properties (for example, poly-carbonate) may be employed.

A scale indicating portion 6 is formed on a surface of the fish-like main body 1 by appropriately applying concave grooves 5, 5 . . . thereto. Then, a heat pressure welded layer 8 using a metallic foil as its material is formed on the entire area of the surface 7 of the scale indicating portion 6 excepting bottom surfaces 5a, 5a. . . of the concave grooves 5, 5 . . . .

An aluminum foil is employed as the metallic foil constituting the heat pressure welded layer 8 in this embodiment because the aluminum foil can reflect light just like the living fish scales of the fish. It should be noted, however, that the material of the heat pressure welded layer 8 is not necessarily limited to the aluminium foil, but it may be a transfer foil made of a non-metallic substance, or a metallic foil made of other metal than aluminum as long as they can reflect light.

The scale indicating portion 6 indicates "scales" and "gills".

A light non-transmitting color-painted layer 9 is formed on that area of the surface of the fish-like main body 1 excepting the scale indicating portion 6, so that the entire fish-like main body 1 including the heat pressure welded layer 8 looks like the real fish.

The color-painted layer 9 is formed by applying an acrylic (or urethane) painting material to the surface of the fish-like main body 1. The heat pressure welded layer 8 is formed by hot stamping. The heat pressure welded layer 8 formed by hot stamping is difficult to be peeled off compared with the technique for bonding a metallic foil or the like to the main body using an adhesive agent. In addition, the layer of the metallic foil can easily be formed.

The hot stamping technique is suitable for forming the heat pressure welded layer because when a metallic foil, for example, superimposed on the surface of the fish-like main body 1 is pressed by a resilient roller made of silicone rubber while heating the metallic foil, the metallic foil is not formed on the bottom surfaces 5a, 5a . . . of the concave grooves 5, 5 . . . because the pressure of the roller is not applied to those areas, and the metallic foil is formed on the remaining area to form the heat pressure welded layer 8.

The metallic foil is formed on the upper side of the concave grooves 5, 5 . . . by resiliency of the roller. The reason is that owing to the foregoing arrangement, light from a luminous material hits the metallic foil layer to brighten the heat pressure welded layer 8. In other words, by doing this, the scale indicating portion 6 looks more like the living fish scales and gills.

Then, a surface layer 10 having water-resisting properties, which is made of a transparent resin, is formed on the surfaces of the layers 8 and 9, namely, the entire surface of the fish-like main body 1, in order to protect the layers 8 and 9.

The surface layer 10 is made of a urethane resin having water-resisting properties.

A luminous material (for example, "PICARICO", merchandise name manufactured by Chemitec) 11 serving as a light source of light passing through the concave grooves 5, 5 . . . is disposed at an inner side of the fish-like main body 1.

In this embodiment, the luminous material 11 is formed as a separate body from the fish-like main body 1. It should be noted, however, that the luminous material 11 may be formed as a layer on the inner side of the fish-like main body 1.

The luminous material 11 is a self-emitting substance for emitting light by receiving ultraviolet energy such as sun light, fluorescent light or the like. The luminous material 11 is capable of emitting a visible light for a long period of time in the dark where no light reaches.

As apparent from the description made hereinbefore, in the day time, the fish-like artificial bait according to the present invention can, of course, exhibit itself as the living fish owing to a provision of the color painted layer and the heat pressure welded layer. In the night time, the luminous material which has received the sun light or the like through the concave grooves, is self-emitted, and this self-emitted light is emitted outwardly of the fish-like main body through the concave grooves. As a consequence, the existence of the "bait" is made apparent, thus enabling to exhibit the function as an artificial bait even in the night time.

Since the light from the luminous material is emitted outwardly of the fish-like main body through the concave grooves as a scale indicating portion, it is not merely served as a "luminous light" but also as a "living fish shape indicating luminous light". Accordingly, the existence of the "bait" is made clearer to the fish.

When the metallic foil is formed on the upper side of the concave grooves (i.e., when the heat pressure welded layer is formed), the light transmitting through the bottom side of the concave grooves is reflected (as indicated, for example, by the arrows of FIG. 3) by the metallic foil and emitted outwardly of the fish-like main body. Accordingly, the fish-like main body looks more like the living fish (the present inventor has confirmed this) compared with a case where the light is emitted directly outwardly of the fish-like main body from the luminous material.

Although the present invention has been described in its preferred form with a certain degree of particularity, it is understood that the present disclosure of the preferred form has been made only by way of example and that numerous changes and modifications in the details of construction and arrangement of component parts may be resorted without departing from the spirit and the scope of the invention as hereinafter claimed.

What is claimed is:

1. A fish-like artificial bait comprising a hollow fish-like main body made of a transparent resin material, a concave groove formed in a surface of said main body and serving as a scale indicating portion, a heat pressure welded layer using a light non-transmitting transfer foil and formed on the surface of said scale indicating portion excepting said concave groove, a light non-transmitting color painted layer formed on the surface of said fish-like main body excepting said scale indicating portion, a light non-transmitting color painted layer formed on the surface of said fish-like main body excepting said scale indicating portion, and a luminous material disposed on an inner side of said fish-like main body and served as a light source for light transmitting through said concave groove.

2. A fish-like artificial bait according to claim 1, wherein a heat pressure welded layer using a water non-permeable transfer foil as its material is formed over an entire area of the surface of said scale indicating portion excepting a surface of a bottom portion of said concave groove.

3. A fish-like artificial bait according to claim 2, wherein a material of said heat pressure welded layer is a metallic foil.

4. A fish-like artificial bait according to claim 1, wherein a water-resisting surface layer made of a transparent resin is formed on an entire area of the surface of said fish-like main body.

5. A fish-like artificial bait according to claim 1, wherein said luminous material is formed as a layer on an inner side of said fish-like main body.

* * * * *